United States Patent
Adragna et al.

(10) Patent No.: US 7,279,876 B2
(45) Date of Patent: Oct. 9, 2007

(54) DEVICE FOR THE CORRECTION OF THE POWER FACTOR IN FORCED SWITCHING POWER SUPPLIES

(75) Inventors: Claudio Adragna, Monza (IT); Giuseppe Gattavari, Busto Arsizio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 296 days.

(21) Appl. No.: 10/877,439

(22) Filed: Jun. 25, 2004

(65) Prior Publication Data

US 2004/0263140 A1    Dec. 30, 2004

(51) Int. Cl.
*G05F 1/40* (2006.01)
(52) U.S. Cl. .................. 323/284; 323/285; 323/299
(58) Field of Classification Search ............ 323/222, 323/283, 284, 285, 288, 299, 301, 282
See application file for complete search history.

(56) References Cited

U.S. PATENT DOCUMENTS

| 6,476,589 B2 * | 11/2002 | Umminger et al. ......... 323/282 |
| 6,580,258 B2 * | 6/2003 | Wilcox et al. ............. 323/282 |
| 7,075,277 B2 * | 7/2006 | Ishii et al. .................. 323/284 |

* cited by examiner

*Primary Examiner*—Jessica Han
(74) *Attorney, Agent, or Firm*—Lisa K. Jorgenson; Stephen Bongini; Fleit Kain Gibbons Gutman Bongini & Bianco P.L.

(57) ABSTRACT

A device is provided for the correction of the power factor in forced switching power supplies. The device includes a converter, and a first control circuit coupled with the converter so as to obtain a regulated voltage on the output terminal from an alternating network input voltage. The converter includes a power transistor, and the first control circuit is suitable for driving the power transistor in every switching cycle comprising the turn-on time and the turn-off time of the power transistor. The device for the correction of the power factor further includes a second control circuit coupled to the first control circuit and capable of modulating the turn-off time of the power transistor.

19 Claims, 10 Drawing Sheets

DEVICE FOR THE CORRECTION OF THE POWER FACTOR IN FORCED SWITCHING POWER SUPPLIES

The present invention refers to a device for the correction of the power factor in forced switching power supplies.

The use of devices for the active power factor correction (PFC) for the forced switching power supplies of common use in electronic equipment such as computers, televisions, monitors, etc. and for supplying fluorescent lamps, that is with forced switching pre-regulator stages that have the task of absorbing an almost sinusoidal current from the network and in phase with the network voltage, is generally known. Therefore a forced switching power supply of the current type comprises a PFC and a DC-DC converter connected to the output of the PFC.

A forced switching power supply of the traditional type comprises a DC-DC converter and an input stage connected to the electrical power distribution network constituted by a full-wave rectifier diode bridge and by a capacitor connected immediately downstream so as to produce a non-regulated direct voltage starting from the alternating sinusoidal voltage of the network. The capacity of the capacitor is big enough so that at its terminals a relatively small ripple is present compared to a continuous level. The rectifier diodes of the bridge, thus, will conduct only for a small portion of each half-cycle of the network voltage, given that its instantaneous value is lower than the voltage on the capacitor for most of the cycle. The result is that the current absorbed by the network will be made up of a series of narrow pulses whose amplitude is 5-10 times the average resulting value.

This has significant consequences: the current absorbed by the line has much greater peak and effective values than in the case of absorption of sinusoidal current, network voltage is distorted by the effect of the impulsive absorption almost at the same time as all the users connected to the network, in the case of three-phase systems the current in the neutral conductor is greatly increased and there is a meagre use of the energy potentials of the electrical power production system. In fact, the impulsive current waveform is rich with odd harmonics which, even though not contributing to the power given to the load, they contribute to increasing the effective current absorbed by the network and thus to increasing the dissipation of energy.

In quantitive terms all this can be express both in terms of Power Factor (PF), intended as ratio between the actual power (that which the power supply gives to the load plus that dissipated inside in the form of heat) and the apparent power (the product of the network effective voltage by the effective current absorbed), both in terms of Total Harmonic Distortion (THD), generally intended as percentage ratio between the energy associated to all the superior order harmonics and that associated to the fundamental harmonic. Typically, a power supply with capacitive filter has a PF of between 0.4-0.6 and a THD exceeding 100%.

A PFC, located between the rectifier bridge and the input of the DC-DC converter, allows an almost sinusoidal current and in phase with the voltage to be absorbed from the network, making the PF near 1 and reducing the THD.

The PFCs generally comprise a converter provided with a power transistor and with an inductor coupled with it and a control device coupled with the converter so as to obtain from an alternated network input voltage a regulated direct output voltage. The control device is capable of determining the turn-on time period $T_{ON}$ and the turn-off time period $T_{OFF}$ of the power transistor; the union of the period of time $T_{ON}$ and of the period of time $T_{OFF}$ gives the cycle period or switching period Tmc of the power transistor.

The PFC type circuits present on the market are basically two which are different from each other in the different control technique used: a Pulse Width Modulation control (PWM) at fixed frequency in which there is a continual conduction of current in the inductor and the PWM control at variable frequency, also called "transition mode" (TM) because the current in the inductor is zeroed exactly at the end of each switching period. The TM control can be operated both by directly controlling the current in the inductor or controlling the period of time $T_{ON}$. The fixed frequency control technique provides better performance but uses a complex circuit structure while the TM technique requires a simpler circuit structure. The first technique is generally used with high power involved while the second technique with medium-low power, generally lower than 200 W.

FIG. 1 shows schematically a pre-regulator PFC stage of the TM type comprising a boost converter 20 and a control device 1. The boost converter 20 comprises a full-wave rectifier diode bridge 2 having in input a network voltage Vin, a capacitor C1 (that acts as a filter for the high frequency) having a terminal connected to the diode bridge 2 and the other terminal connected to ground, a series of two resistances Ra and Rb in parallel with the capacitor C1 upstream from it, an inductance L connected to a terminal of the capacitor C1, an MOS power transistor M having the drain terminal connected to a terminal of the inductance L downstream from the latter and having the source terminal connected to a resistance Rs connected to ground, a diode D having the anode connected to the terminal in common with the inductance L and with the transistor M and the cathode connected to a capacitor Co having the other terminal connected to ground. The boost converter 20 generates in output a direct voltage Vout on the capacitor Co greater than the maximum network peak voltage, typically 400 V for systems powered with the European network or with universal powering. This voltage Vout will be the input voltage of the DC-DC converter connected to the PFC.

Assuming that the current absorbed from the network by the PFC in almost stationery normal operating conditions (that is with constant input effective voltage and output load) is sinusoidal, in every turn-on cycle of the transistor M the peak current of the inductor L is worth $Ip=Vin*T_{ON}/L$ where $T_{ON}$ is the period of time in which the transistor M is on. Given that the input voltage is sinusoidal, if $T_{ON}$ is kept constant within each network cycle, the peak current of the inductor L will be enveloped by a sinusoid. A suitable filter positioned between the network and the input of the rectifier bridge (always present for matters of electromagnetic compatibility) will mediate the current in input eliminating the high frequency components, therefore the current absorbed from the network will be a sinusoid of the same frequency and in phase with network voltage.

Normally in TM type PFCs controlled in peak current mode the constancy of the turn-on time $T_{ON}$ is a consequence of forcing the peak current of the inductor to follow a sinusoidal reference. This reference is derived from the voltage rectified after the bridge and corrected in amplitude with the error signal coming from the adjusting loop of the output voltage, by means of a multiplier block. The constant $T_{ON}$ approach, presents the advantages of not needing either the reading of the input voltage or a multiplier block.

The control device 1 has to maintain the output voltage Vout at a constant value by means of a feedback control action. The control device 1 comprises an operational error amplifier 3 suitable for comparing a part of the output voltage Vout, that is the voltage Vr given by Vr=R2*Vout/(R2+R1) (where the resistances R1 and R2 are connected in series between each other and in parallel with the capacitor Co) present at the inverting terminal with a reference voltage Vref, for example with the value of 2.5V, present at the non-inverting terminal and generates an error signal Se proportional to their difference. The output voltage Vout presents a ripple at a frequency that is double that of the network and overlayed to the continuous value. If however the band amplitude of the error amplifier is reduced considerably (typically lower than 20 Hz) by means of the use of a compensating network Rcomp located between the output and the inverting input of the operational error amplifier and we assume an almost stationery operating, that is with constant input effective voltage and output load, this ripple will be greatly attenuated and the error signal will become constant.

The error signal Se is sent to a multiplier Mol and is multiplied by a voltage Vrt given by a percentage of the network voltage Vin rectified by the diode bridge 2. The output signal Vm is sent to the non-inverting input of a comparator PWM 5 while a voltage signal Vrsense coming from the resistance Rs located between the MOS transistor M and ground insists on the inverting input. When the two voltages Vrsense and Vm are the same the MOS transistor M is off.

After the transistor M has been turned off the inductor L discharges the energy stored in it on the load until it is completely emptied. At this point, the diode D does not allow the conduction of current and the drain terminal of the transistor M remains floating, therefore its voltage Vdrain tends to instantaneous input voltage through resonance oscillations between the stray capacitance of the terminal and the inductance of the inductor L. Therefore there is a rapid drop in the drain voltage Vdrain that is coupled by means of an auxiliary winding of the inductor L to the terminal to which a zero current detecting block ZCD 7 being part of the block 6 is connected. This block 7 detects this negative edge, sends an pulse signal to a gate OR 8 whose other input is connected to a starter 10, suitable for sending a signal to the gate OR 8 at the instant starting time; the output signal S of the gate OR 8 is the set input S of a set-reset flip-flop 11 having another input R that is the signal in output to the device 5, and having an output signal Q. The signal Q is sent in input to a driver 12, which, in this case, commands the transistor M (in other cases it can command it to be turned off) to be turned on again. In this manner the PFC works in transition mode. FIG. 2 shows the current IL on the inductance L, the signal GM controlling the turn-on and the turn-off of the MOS transistor M, the current IM in the MOS transistor and the current ID in the diode D. The current absorbed from the network is the low frequency component Ilbf of the current of the inductor L, that is the average current for switching cycle given that the switching frequency component is eliminated by the filter positioned at the input of the converter stage; said average current will have a sinusoidal path.

For the applications in which a power lower than 400 W is used, normally a TM type PFC is used, even if the peak and effective currents are very high. For this reason a network filter is used as it is necessary for the electromagnetic compatibility, that is an EMI filter, which is quite costly.

In view of the state of the technique, the object of the present invention is to provide a device for the correction of the power factor in forced switching power supplies that overcomes the above-mentioned inconvenience.

In accordance with the present invention this object is achieved by means of a device for the correction of the power factor in forced switching power supplies, comprising a converter and a control circuit coupled with said converter so as to obtain from an alternated network input voltage a voltage regulated on the output terminal, said converter comprising a power transistor, said control circuit being suitable for driving said power transistor in every switching cycle comprising the turn-on time and the turn-off time of said power transistor, characterised in that it comprises control means coupled to said control circuit and capable of modulating the turn-off time of said power transistor.

The characteristics and the advantages of the present invention will appear evident from the following detailed description of its embodiments, illustrated as non-limiting examples in the enclosed drawings, in which.

Figure 11:
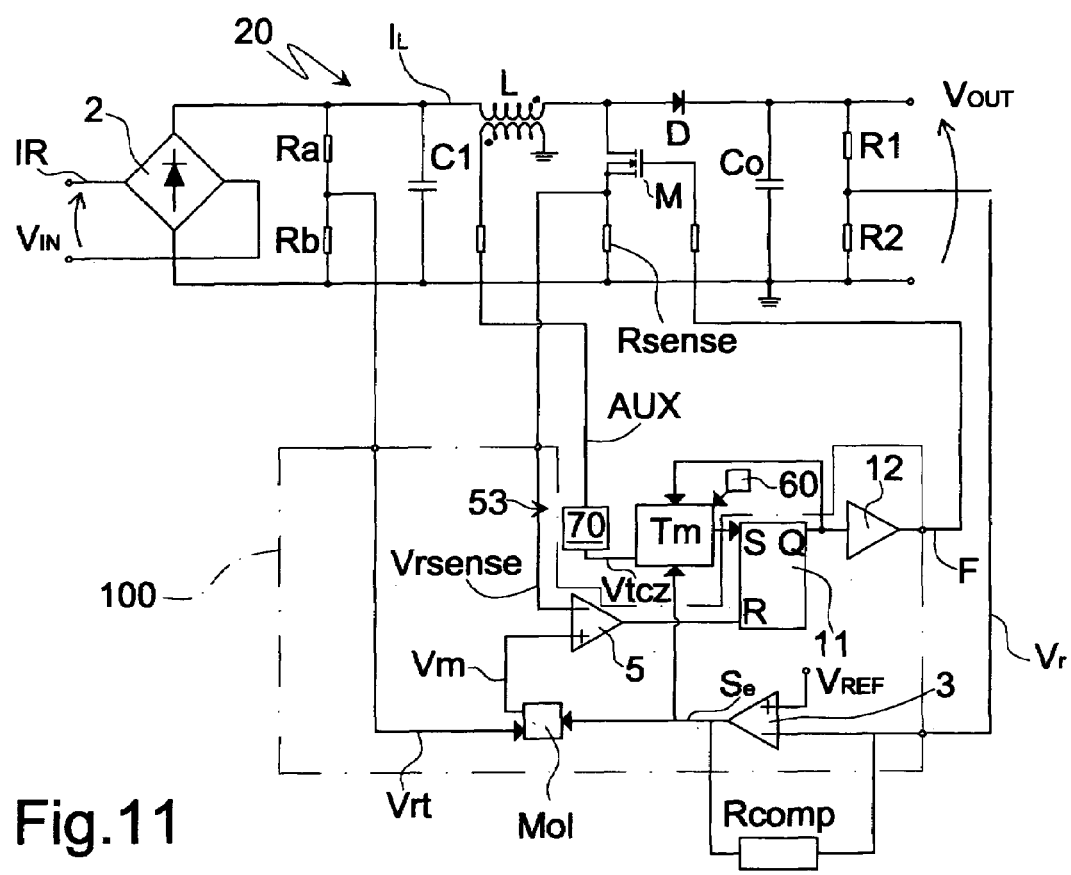
FIG. 11 shows a circuit diagram of a PFC according to a third embodiment of the present invention.
Figure 13:
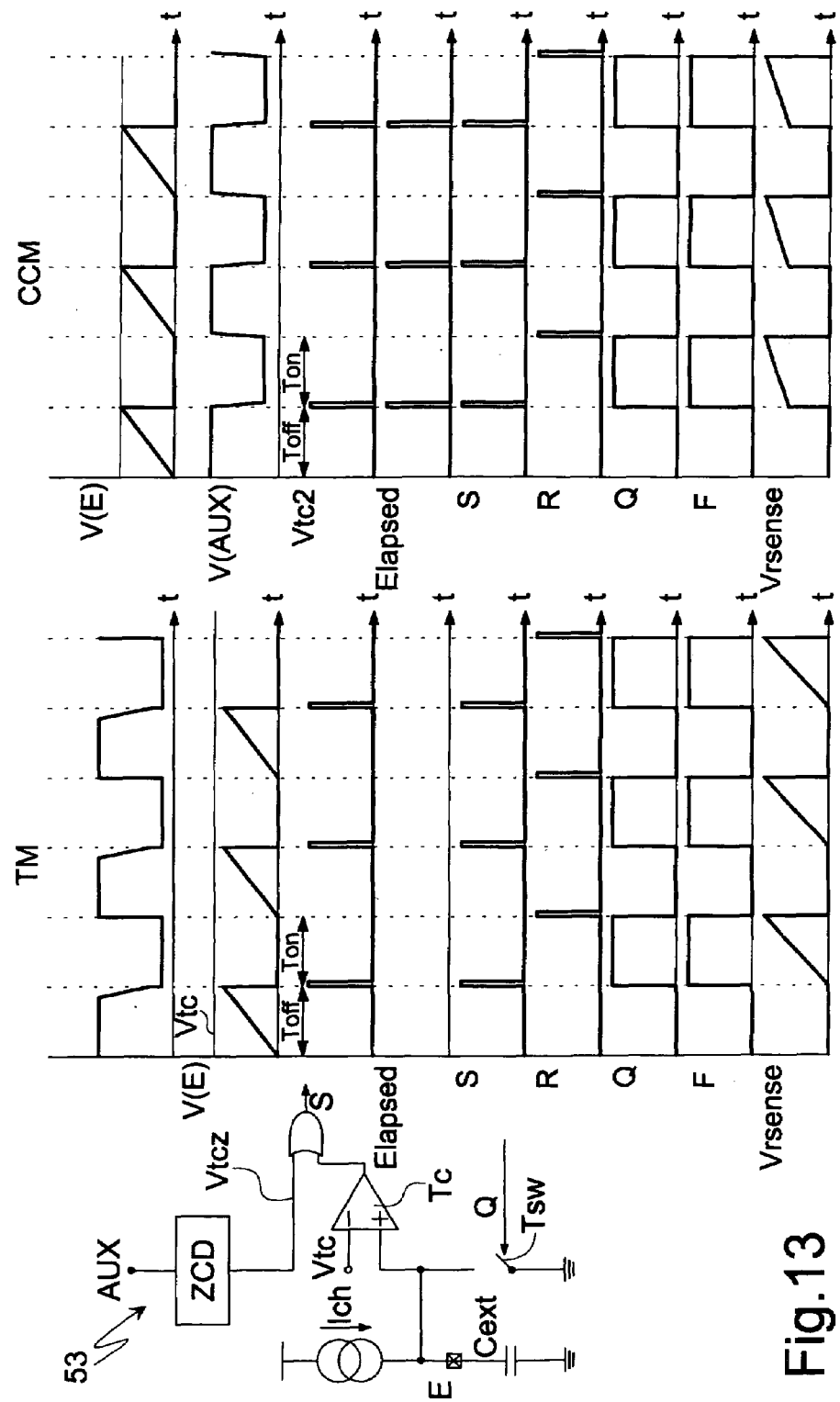
Figure 14:
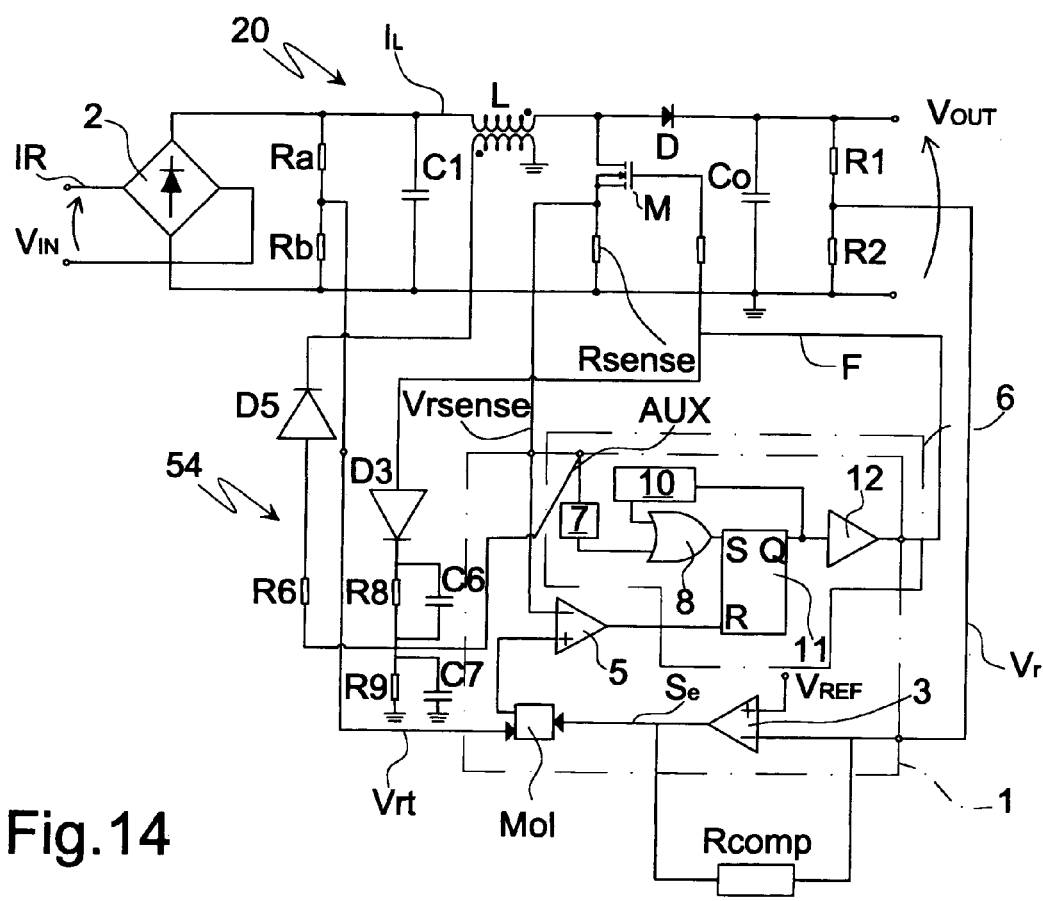
Figure 15:
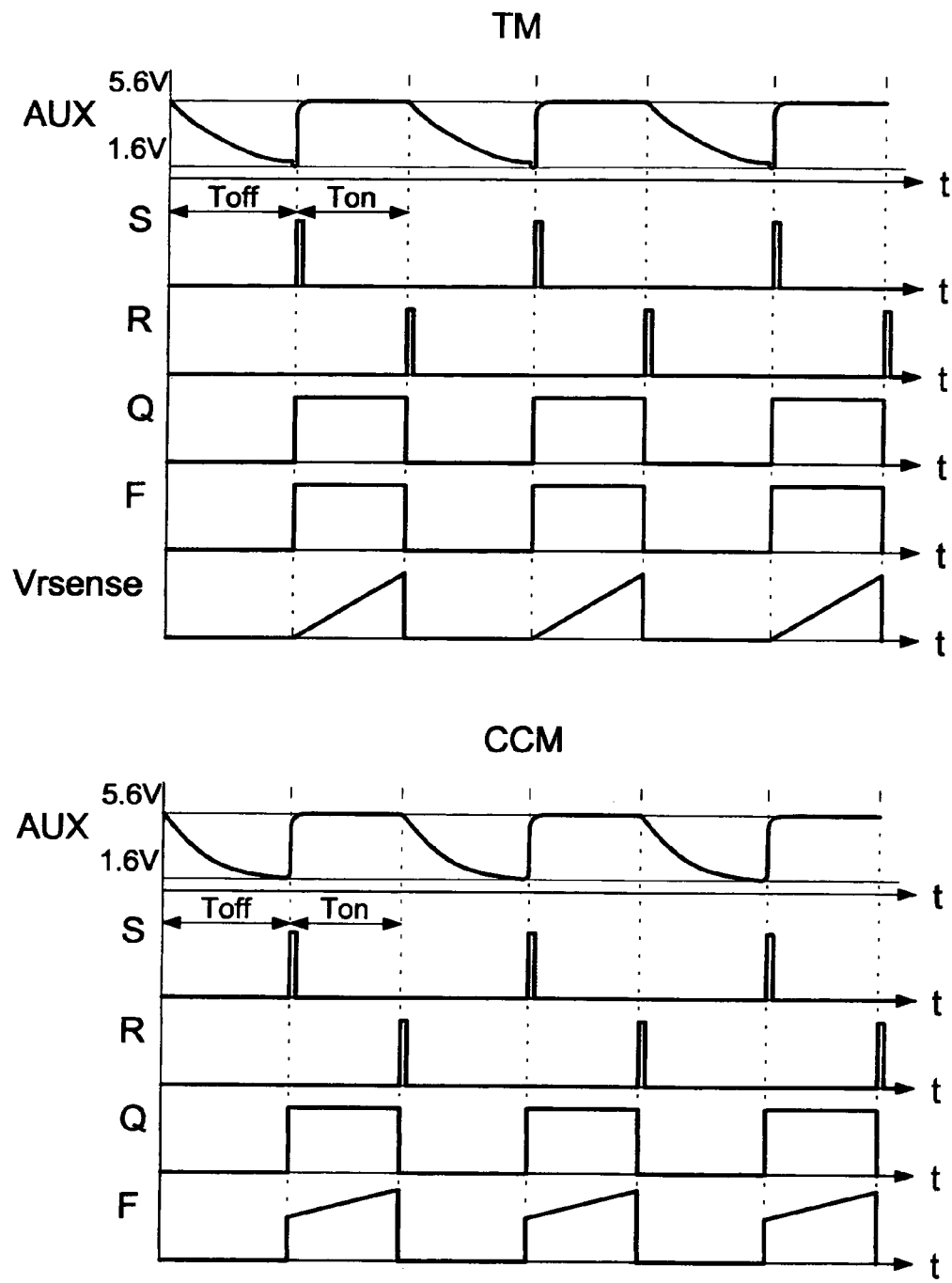

FIG. 13 a circuit implementation of the counter of FIG. 11 and time diagrams of signals of the PFC according to a variant to the third embodiment of the invention with the counter implemented as shown in said Figure;

FIG. 14 shows a circuit diagram of a PFC according to another variant to the third embodiment of the present invention;

FIG. 15 shows time diagrams of signals relating to the PFC of FIG. 14.

Figure 1:
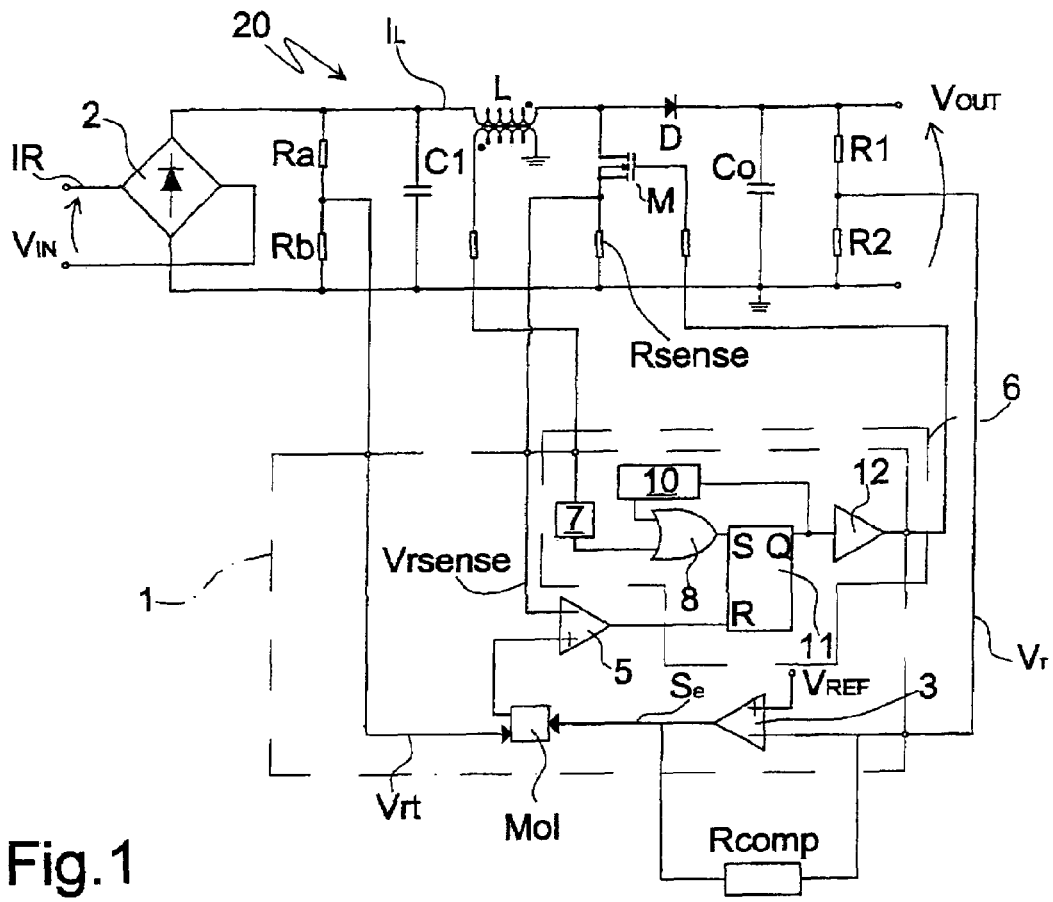
FIG. 1 shows a circuit diagram of a TM type PFC in accordance with the known art.
Figure 2:
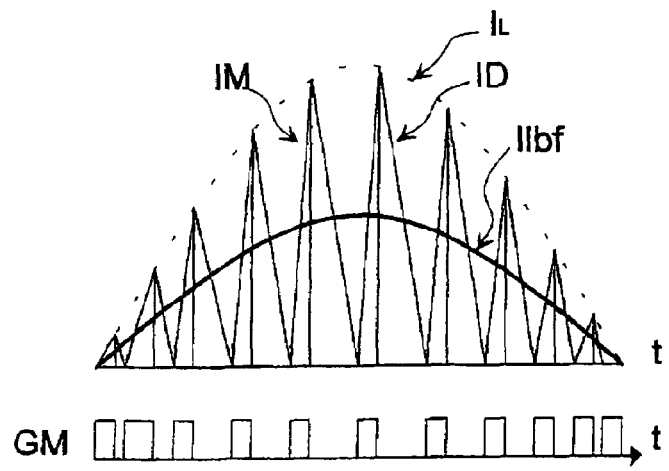
FIG. 2 shows a time diagram of the current signals in the inductor, in the MOS transistor and in the diode D of the circuit of FIG. 1 and the command signal of the MOS transistor of the circuit of FIG. 1.
Figure 3:
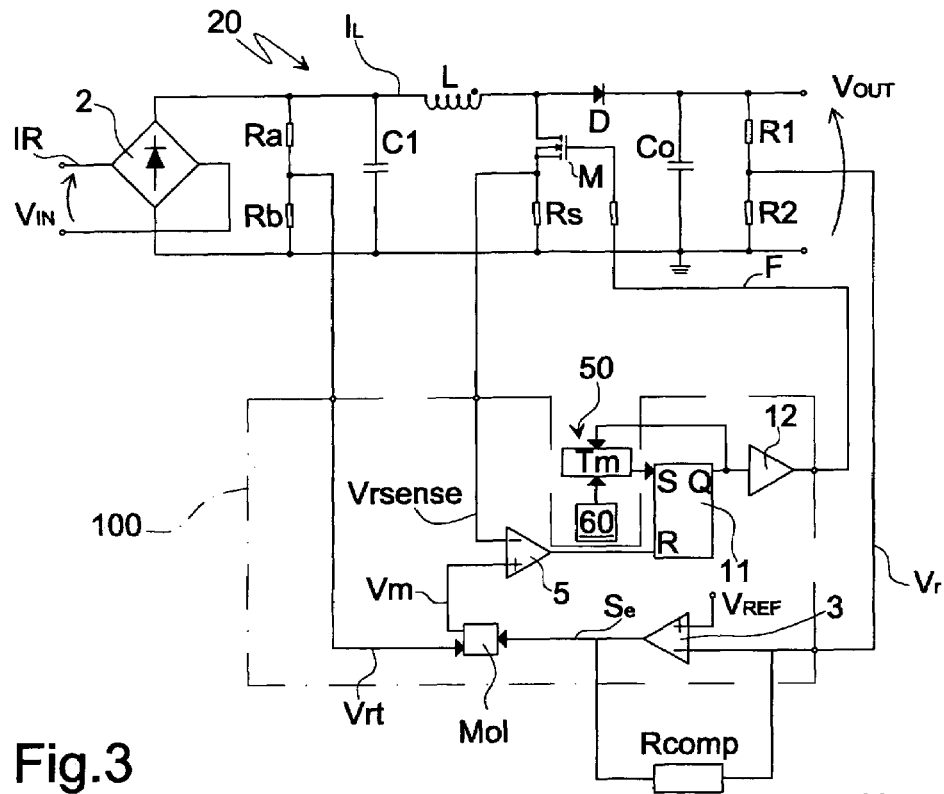
FIG. 3 shows a circuit diagram of a PFC according to a first embodiment of the present invention.

With reference to FIG. 3 a circuit diagram of a PFC is shown according to a first embodiment of the present invention; the elements the same as the elements of the circuit of FIG. 1 will be indicated with the same numeric references. The PFC of FIG. 3 comprises a boost converter 20 and a control device 100. The boost converter 20 comprises a full-wave rectifier diode bridge 2 having in input a network voltage Vin, a capacitor C1 (that acts as filter for the high frequency) having a terminal connected to the diode bridge 2 and the other terminal connected to ground, a series of two resistances Ra and Rb in parallel with the capacitor C1 upstream of it, an inductance L connected to a terminal of the capacitor C1, an MOS power transistor M having the drain terminal connected to a terminal of the inductance L downstream from the latter and having the source terminal connected to a resistance Rs connected to ground, a diode D having the anode connected to the terminal in common with the inductance L and with the transistor M and the cathode connected to a capacitor Co having the other terminal connected to ground. The boost converter 20 generates in output a direct voltage Vout on the capacitor Co greater than the maximum network peak voltage, typically 400 V for systems powered with the European network or with universal powering. This voltage Vout will be the input voltage of the DC-DC converter connected to the PFC.

The control device 100 must maintain the output voltage Vout at a constant value by means of a feedback control action. The control device 100 comprises an operational error amplifier 3 suitable for comparing a part of the output voltage Vout, that is the voltage Vr given by Vr=R2*Vout/(R2+R1) (where the resistances R1 and R2 are connected in series between each other and in parallel with the capacitor Co) present on the inverting terminal with a reference voltage Vref, for example with the value of 2.5V, present on the non-inverting terminal and generates an error signal Se proportional to their difference. The output voltage Vout presents a ripple at a frequency double that of the network and overlaying the continuous value. If however the band amplitude of the error amplifier is reduced considerably (typically lower than 20 Hz) by means of the use of a compensating network Rcomp located between the output and the inverting input of the operational error amplifier and we assume an almost stationery normal operating, that is with constant input effective voltage and output load, this ripple will be greatly attenuated and the error signal will become constant.

The error signal Se is sent to a multiplier Mol and is multiplied by a voltage Vrt given by a percentage of the network voltage Vin rectified by the diode bridge 2, that is Vrt=Vin*Rb/(Ra+Rb). The output signal Vm, which is a rectified sinusoidal signal whose amplitude will depend on the network voltage and on the signal Se, is sent to the non-inverting input of a comparator PWM 5 while on the inverting input a voltage signal Vrsense coming from a resistance Rs located between the MOS transistor M and ground insists. When the two voltages Vrsense and Vm are the same the comparator PWM 5 sends a reset signal R to the flip-flop 11 which through the driver 12 sends a pulse F to the MOS transistor M to turn it off.

Therefore the output signal Vm of the multiplier Mol, determining the turn-off of the transistor M, determines the peak current in the MOS transistor M, that coincides with the peak of the current $I_L$ that flows in the inductor L and which will be enveloped by a rectified sinusoid. The following is obtained:

$I_{Lenv}(t)=I_{Lpk} \sin \theta$ where $I_{Lenv}(t)$ is the enveloping of the peaks of the current $I_L$ of the inductor, $I_{Lpk}$ the maximum value of the peaks, that depends both on the input power and on the network voltage, and θ is the instantaneous phase angle of the network voltage, that varies between 0 and π (after the rectifier bridge, in terms of phase angle, the quantities are even periodic functions of π).

Said PFC comprises control means 50 coupled to said drive circuit 100 and capable of modulating the turn-off time $T_{OFF}$ of said power transistor M.

In FIG. 3 the control means 50 comprise a counter Tm that is activated by the output Q of the flip-flop 11. Once a certain period of time has passed, that is the turn-off time $T_{OFF}$, the counter Tm sends an pulse S to the flip-flop 11 determining the MOS transistor M to be turned on. Said period of time $T_{OFF}$ is therefore kept fixed for every switching cycle, that is for every period of time comprising the turn-on period and the turn-off time of the MOS transistor M. A device 60 for calibrating the current generator Ich and the capacitor Cext is also present.

Figures 4, 4B:
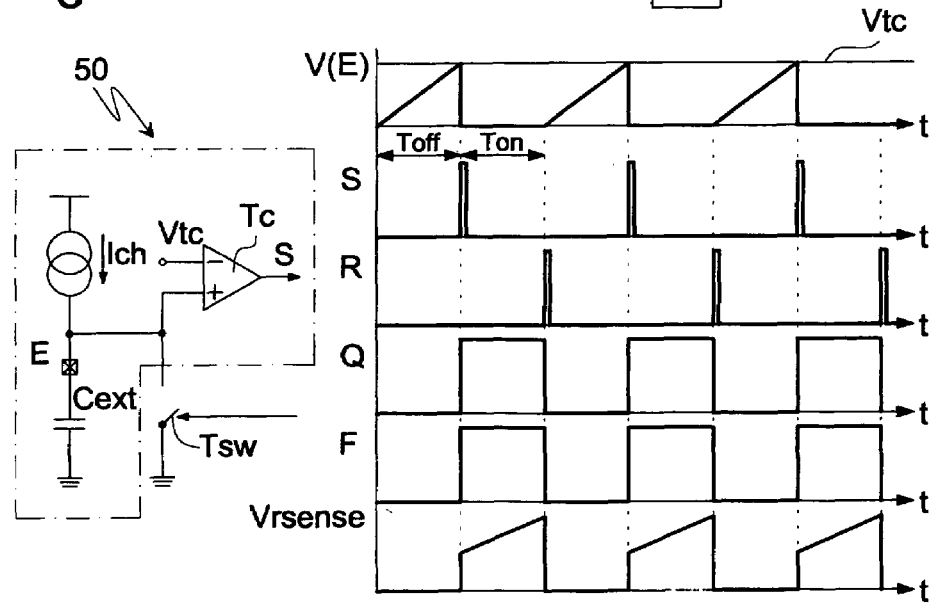
FIG. 4 shows a circuit implementation of the counter of FIG. 3.
FIGS. 4b and 4c show time diagrams relating to command signals, to voltage signals and to current signals in several branch points of the circuit of FIG. 3 with the counter implemented like the circuit of FIG. 4.

FIG. 4b shows the most significant signals that determine the turn-on and the turn-off of the MOS transistor M inside the control device 100 in the hypothesis that the counter Tm is made by means of the circuitry of FIG. 4. The counter Tm comprises a capacitor Cext connected between ground and a current generator Ich, a comparator Tc having the non-inverting terminal connected to the terminal in common between capacitor Cext and current generator Ich while on the inverting terminal a voltage reference Vtc is present. The non-inverting terminal of the comparator Tc is connected to a switch Tsw driven by the signal Q. When the voltage on the capacitor Cext reaches the signal Vtc the signal S is sent to the flip-flop 11. A device 60 is also present, outside the counter Tm, for calibrating the current generator Ich and the capacitor Cext.

FIG. 4 shows the signals R, Q, S, the signal at the terminals of the capacitor V(E), the signal on the resistance Rs Vrsense and the signal F for driving the MOS transistor M.

During the turn-off time $T_{OFF}$ in which the MOS transistor M is off the inductor L discharges the energy stored in it on the load. If the time $T_{OFF}$ is sufficient to completely discharge the inductor L there will be, in that switching cycle, a discontinuous type of operating, otherwise there will be a continuous type of operating. Therefore, near the zeros of the network voltage where the current of the inductor L will be small, the discontinuous type of operating will prevail while near the peaks of the network sinusoid, that is when the current of the inductor L is higher, the continuous type of operating will prevail. The border between the two operative modes of the inductor can be determined equalling the variation $\Delta I_L(\theta)$ of the current of the inductor during the time $T_{OFF}$ with the value at the beginning of the period of time $T_{OFF}$, that is the value of peak current:

$$\Delta I_L(\theta) = \frac{Vout - Vpk \sin\theta}{L} T_{OFF} = I_{Lpk} \sin\theta,$$

where Vout is the regulated output voltage of the PFC and Vpk is the peak voltage of the input voltage Vin. It can be noted that in the case in which the boost converter 20 is the "tracking" type, that is in which the output voltage Vout is proportional to the network peak voltage Vpk, with Vout always greater than Vpk, we will obtain:

$Vout=p+qVpk,$ where the quantities p and q are known.

The previous equation resolved in relation to θ, supplies the values of the phase angle $\theta_T$ that mark the passage from the discontinuous mode, called DCM mode, to the continuous mode, also called CCM mode:

$$\theta_T = \sin^{-1}\frac{V_{out}T_{OFF}}{LI_{Lpk} + V_{pk}T_{OFF}};$$

in the sphere of each network half-cycle there will be discontinuous mode for $\theta<\theta_T$ and $\theta>\pi-\theta_T$, and continuous mode for $\theta_T<\theta<\pi-\theta_T$.

Figure 4C:
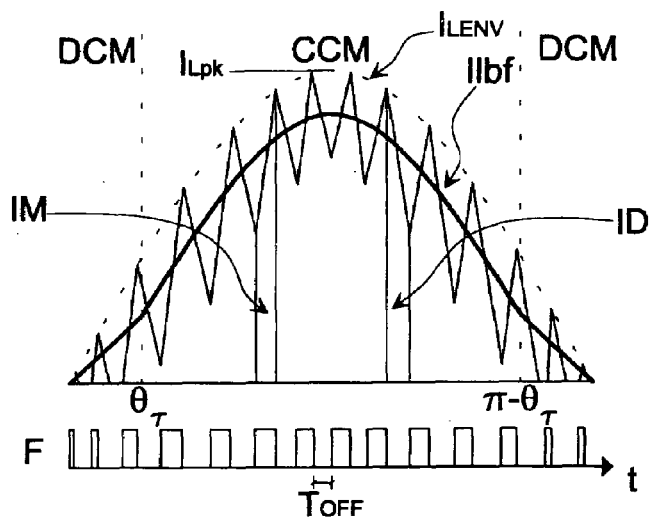

FIG. 4c shows schematically the course of the current $I_L$ in the inductance L highlighting the part IM of this current that also flows in the power transistor M and the part ID that flows in the diode D. The low frequency component Ilbf is also shown that, by the effect of the filtering operated by the network filter positioned at the input of the converter boost 20, always present for the electromagnetic compatibility regulations, is absorbed by the network.

During the portion DCM of the network cycle the transistor M remains on for a constant time $T_{ON}$ and equal to:

$$T_{ON(DCM)} = \frac{LI_{Lpk}}{V_{pk}}$$

therefore, $T_{OFF}$ being constant by definition, the switching frequency $f_{sw}$ and the duty-cycle Dc of the transistor M are also constant:

$$f_{sw(DCM)} = \frac{1}{T_{ON(DCM)} + T_{OFF}} = \frac{1}{\frac{LI_{Lpk}}{V_{pk}} + T_{OFF}};$$

$$Dc_{(DCM)} = \frac{T_{ON(DCM)}}{T_{ON(DCM)} + T_{OFF}} = \frac{1}{1 + \frac{V_{pk}T_{OFF}}{LI_{Lpk}}}$$

Always in the part DCM of the network cycle, the period of time $T_{FW}(\theta)$ needed by the current $I_L$ to reset (which will be lower than the period of time $T_{OFF}$) is given by:

$$T_{FW}(\theta) = \frac{LI_{Lpk}\sin\theta}{V_{out} - V_{pk}\sin\theta},$$

and thus the duty cycle $D_L(\theta)$ of circulation of the current $I_L$ in the inductor L, is given by:

$$D_L(\theta) = \frac{T_{ON} + T_{FW}}{T_{ON} + T_{OFF}} = \frac{1 + \frac{V_{pk}}{V_{out}}\sin\theta}{1 + \frac{V_{pk}T_{OFF}}{LI_{Lpk}}}$$

In the part CCM of the network cycle, where it is $D_L(\theta)=1$ by definition, using the previous relations we have:

$$T_{ON}V_{pk}\sin\theta = T_{OFF}(V_{out} - V_{pk}\sin\theta) \Rightarrow T_{ON(CCM)} = \left(\frac{V_{out}}{V_{pk}\sin\theta} - 1\right)T_{OFF},$$

while the duty cycle $Dc(\theta)$ of the MOS transistor M will be:

$$Dc_{(CCM)}(\theta) = 1 - \frac{V_{pk}}{V_{out}}\sin\theta.$$

Therefore the length of the period of time $T_{ON}$ can become very brief with a high instantaneous network voltage: for example, with Vin=264 Vac and with Vout=400V, on the upper part of the sinusoid, the period of time $T_{ON}$ is only 7% of the period of time $T_{OFF}$. This means that it is possible to have considerably lower periods of time $T_{ON}$ than 1 μs independently from the load of the PFC.

Therefore, in executing the counter Tm, guarantee has to be made that the capacitor Cext is discharged in lower time than the minimum period of time $T_{ON}$ provided for; from this it results that limits are imposed on the maximum value of Cext itself as well as on the resistance of the switch Tsw commanded by the signal Q. If these conditions are not observed briefer periods of time $T_{OFF}$ are obtained and thus higher switching frequencies with consequent increases in consumption, at the most, risks of saturation of the inductor L.

In the part CCM of the network cycle, thus, $T_{OFF}$ being constant and $T_{ON}$ variable, the switching frequency $f_{sw}$ will also change, with the instantaneous network voltage:

$$f_{sw(CCM)} = \frac{1}{T_{ON(CCM)} + T_{OFF}} = \frac{V_{pk}}{V_{out}T_{OFF}}\sin\theta$$

For continuity, when $\theta=\theta_T$ there must be $Dc_{(CCM)}=Dc_{(DCM)}$, therefore it can also be written:

$$Dc_{(DCM)} = 1 - \frac{V_{pk}}{V_{out}}\sin\theta_T$$

and again:

$$D_L(\theta) = \frac{1 - \frac{V_{pk}}{V_{out}}\sin\theta_T}{1 - \frac{V_{pk}}{V_{out}}\sin\theta}$$

Once all the timing relations have been established it is possible now to determine the power relations and finally connect the value of $I_{Lpk}$ to the input power and to the network voltage.

The current in the inductor will be thus made up of a succession of upward slopes (during the time $T_{ON}$) and downward slopes (during the time $T_{OFF}$) whose peak values are enveloped by the equation $I_{Lenv}(t)=I_{Lpk}\sin\theta$ and whose low sides reach zero in the portion DCM of the network cycle ($\theta<\theta_T$ and $\theta>\pi-\theta_T$), while in the portion CCM ($\theta_T<\theta<\pi-\theta_T$) they stay greater than zero. The current ripple will be thus given by:

$$\Delta I_L(\theta) = \begin{cases} I_{Lpk} \sin \theta & DCM \\ \dfrac{Vout - Vpk \sin \theta}{L} T_{OFF} & CCM \end{cases} \quad 5$$

which, given that it results rising with θ in the portion DCM and decreasing with θ in the portion CCM, has its maximum value at the transition from DCM to CCM and vice versa which is equal to:

$$\Delta I_{Lpk\,(max)} = I_{Lpk} \sin \theta_T.$$

The value of $\theta_T$ compared to L was deduced from a previous equation and replacing it in the previous expression, the latter can be written in the form:

$$\Delta I_L(\theta) = \begin{cases} I_{Lpk} \sin \theta & DCM \\ I_{Lpk} \dfrac{\sin \theta_T}{1 - \dfrac{Vpk}{Vout} \sin \theta_T} \left(1 - \dfrac{Vpk}{Vout} \sin \theta\right) & CCM \end{cases} \quad 20$$

The average current in the inductor L, will be given by:

$$I_{Lav}(\theta) = \begin{cases} \dfrac{1}{2} I_{Lenv}(\theta) D_L(\theta) & DCM \\ I_{Lenv}(\theta) - \dfrac{1}{2} \Delta I_L(\theta) & CCM \end{cases}$$

which, replacing several previous equations and placing k=Vpk/out, assumes the form:

$$I_{Lav}(\theta) = \begin{cases} \dfrac{1}{2} I_{Lpk} \sin \theta \dfrac{1 - k \sin \theta_T}{1 - k \sin \theta}, & \sin \theta \le \sin \theta_T (DCM) \\ \dfrac{1}{2} I_{Lpk} \left[\left(2 + \dfrac{k \sin \theta_T}{1 - k \sin \theta_T}\right) \sin \theta - \dfrac{\sin \theta_T}{1 - k \sin \theta_T}\right], & \sin \theta > \sin \theta_T (CCM) \end{cases}$$

while the current Iin(θ) absorbed by the line is the odd counter-part of the $I_{Lav}(\theta)$:

$$Iin(\theta) = \begin{cases} \dfrac{1}{2} I_{Lpk} \sin \theta \dfrac{1 - k \sin \theta_T}{1 - k |\sin \theta|}, & |\sin \theta| \le \sin \theta_T \ (DCM) \\ \dfrac{1}{2} I_{Lpk} \left[\left(2 + \dfrac{k \sin \theta_T}{1 - k \sin \theta_T}\right) \sin \theta - \dfrac{\sin \theta_T}{1 - k \sin \theta_T} sgn(\sin \theta)\right], & |\sin \theta| > \sin \theta_T \ (CCM) \end{cases}$$

The line current Iin(θ) is thus made up, during the phase CCM, that is with $\theta_T < \theta < \pi - \theta_T$, of a portion of sinusoid transferred downwards during the positive semi-cycles and upward during the negative semi-cycles of the network voltage Vin and in phase with the network voltage. During the phase DCM the line current Iin(θ) comprises a portion linked to the zeros of the voltage by means of non-sinusoidal arcs. Thus there is a distortion of the line current Iin(θ), therefore it is not possible to obtain a unitary power factor. This distortion is as great as the angle $\theta_T$ that is as broad as the portion DCM is.

The value of $I_{Lpk}$ can be determined considering that the power at the input of the PFC is given by:

$$Pin = \dfrac{1}{2\pi} \int_0^{2\pi} Vpk \sin \theta \, Iin(\theta) d\theta = \dfrac{1}{\pi} \int_0^{\pi} Vpk \sin \theta \, I_{Lav}(\theta) d\theta.$$

Replacing $I_{Lav}(\theta)$ with the previously deduced expression and taking the symmetry of $I_{Lav}(\theta)$ in relation to π/2 into account, the previous expression assumes the form:

$$Pin = \dfrac{1}{2\pi} Vpk I_{Lpk} \left\{ 2(1 - k \sin \theta_T) \int_0^{\theta_T} \dfrac{\sin^2 \theta}{1 - k \sin \theta} d\theta + \int_{\theta_T}^{\pi - \theta_T} \left[\left(2 + \dfrac{k \sin \theta_T}{1 - k \sin \theta_T}\right) \sin \theta - \dfrac{\sin \theta_T}{1 - k \sin \theta_T}\right] d\theta \right\}$$

The expressions of the integrals contained in the above-mentioned expression are rather complex and of little practical use for the purposes of a calculation procedure for the project. To obtain formulas that can be handled it is wise to develop the integrals in series of Mc-Laurin in relation to $\theta_T$. It results that the first integral, relating to the portion DCM, supplies a contribution of the third order and therefore will be unheeded. Considering the first degree term of the development of the second integral, relating to the portion CCM, and resolving the resulting equation in relation to $I_{Lpk}$ it results that:

$$I_{Lpk} = \dfrac{2 \, Pin}{Vpk} \dfrac{1}{1 + \dfrac{4 - k\pi}{2\pi} \theta_T}.$$

Figure 5:
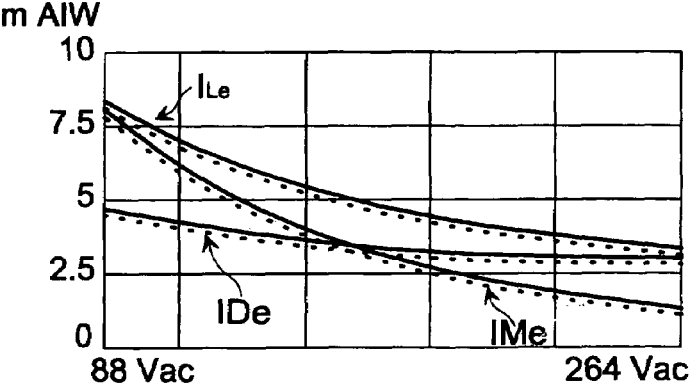
FIG. 5 is a diagram of the currents circulating in the inductance, in the MOS transistor and in the diode of the PFC of FIG. 3 upon variation of the input voltage.

The peak value of the line current can be derived placing θ=π/2, and is the form:

$$Iin_{pk} = \lambda \frac{2 \, Pin}{Vpk}$$

where λ is a constant >1. It can be seen that the quantity 2Pin/Vpk represents the peak value of the line current Iin(θ) in the case of use of the known circuit of FIG. 1. As λ>1, the result is that with the circuit of FIG. 3, with equal power involved, the peak current and thus also the effective current are slightly greater than what would be obtained with the circuit of FIG. 1, because of the portion DCM. Also the effective currents in the transistor M, in the diode D and in the inductor L of the PFC of FIG. 3 are greater compared to those of a known PFC and provided with a fixed frequency controller for high powers. Nevertheless, as the portion DCM contributes not very significantly to the power involved, it can be deduced that the reduction of the average and effective values of the currents in the circuit, compared to the known circuit of FIG. 1, is very limited. FIG. 5 shows in a dotted line the effective currents IMe in the transistor M and IDe in the diode D and $I_{Le}$ in the inductor L of the above-mentioned known circuit with fixed frequency controller and in a continuous line those of the circuit of FIG. 3 by power watts circulating.

The presence of the portion DCM, nevertheless, produces some benefits: in this zone, that typically occupies about 30% of the network cycle, on the contrary to what happens in the part CCM, the inverse recovery of the diode D is not stressed; in this manner the losses in the diode D itself and those induced in the transistor M, due to the recovery, are absent. Again, in the part DCM the capacitive losses due to the discharge of the stray capacitance of the drain branch point upon the transistor M being turned on are reduced; in fact, for a brief period, there is even turn-on at zero voltage (soft-switching), that completely eliminates the above losses. This reduction of recovery and capacitive losses compensates the slight increase of the conduction losses and can also lead to lower total losses. In the known systems with fixed frequency controller this phenomenon is not present: the diode D is stressed in recovery during the whole network cycle.

Figure 6:
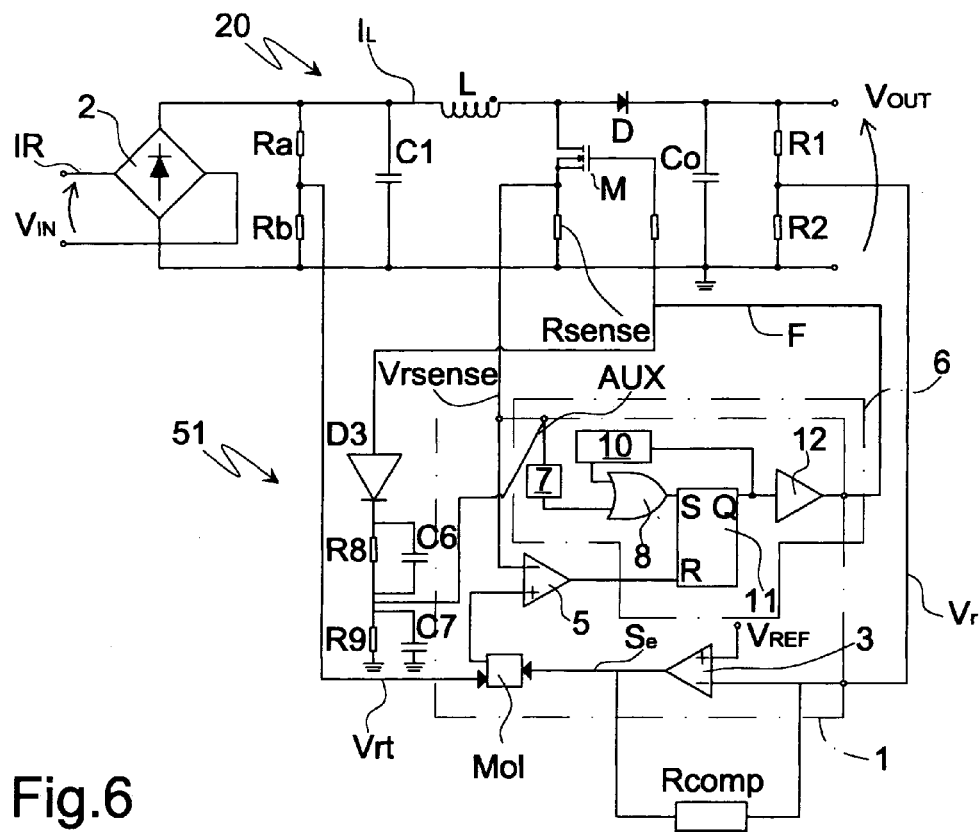
FIG. 6 shows a circuit diagram of a PFC according to a variant to the first embodiment of the present invention.

The $T_{OFF}$ constant control of a PFC does not effectively need a dedicated controller; it can be made simply by using any standard TM type controller with the insertion of a device 51 that carries out said control. FIG. 6 shows a PFC according to a variant to the first embodiment of the present invention. The PFC of FIG. 6 comprises the control circuit 1 of FIG. 1 with the addition of the device 51 according to the invention that allows the $T_{OFF}$ constant control. In the specific case the device L6561 produced by STMicroelectronics is used as control device 1.

The circuit of FIG. 6, in particular the device 1, that is in that case the device L6561, comprises the zero detector 7, which, in the conventional operation of the device 1 (as is revealed in the description of the circuit of FIG. 1) detects the demagnetisation of the inductor L, sends the set pulse S to the flip-flop 11 belonging to the device L6561, commands the MOS transistor M to be turned on when for example the voltage on the terminal AUX of the auxiliary winding of the inductor L and in input to the zero detector (ZCD) 7, starting from a value that must be greater than 2.1V, goes below 1.6V, that is a zero is detected by the ZCD 7. The voltage on the terminal AUX in the circuit of FIG. 6 is limited internally upward (at about 5.6V) and downward (at about 0.7V) by a double circuit clip, which can absorb or deliver a limited current at several milliamperes.

In regard to the execution of the circuit 51 that allows operation at TOFF constant, it necessarily has to partition the drive voltage of the gate terminal of the MOS transistor M, which normally is greater than 10V, given that the level of upper clipping of the terminal AUX is definitely lower; this is done by inserting the resistance R8. The device 51 comprises a diode D3 with anode connected to the gate terminal of the transistor M, the parallel of a capacitor C6 and of the resistance R8 located between the cathode of the diode D3 and the terminal AUX, the parallel of a resistance R9 and of a capacitor C7 located between the terminal AUX and ground. The resistance R8 slows the charge of the timing capacitor C7, which makes the problem of keeping the programmed value of $T_{OFF}$ at high network voltage almost inevitable. To work with very low capacitance values is not a good solution because it makes the value of $T_{OFF}$ very sensitive to the stray capacitance and thus difficult to repeat in a mass production. To avoid this problem the capacitance C6 intervenes that allows a compensated divider to be obtained which, ideally, would charge the capacitor C7 in zero time. In practice, in this manner it is not difficult to complete the charge of C7 in 100-200 ns.

The auxiliary winding of the inductor L, necessary in the TM systems to identify the demagnetisation, with the control at constant $T_{OFF}$ is not present, with this permitting a saving on the cost of producing the inductor L itself. Therefore the terminal AUX is not connected to an auxiliary winding of the inductor L.

When the voltage on the gate terminal of the transistor M goes high the timing capacitor C7 is first of all charged (ideally in zero time) by the capacitor C6 up to a slightly lower value than the high clipping threshold; this happens to prevent an uncontrolled current from being sent into the upper clipper circuit. The capacitor C6 must thus satisfy the relation:

$$C6 < C7 \frac{5.6}{V_{GDx} - 5.6 - V_F}$$

where $V_{GDx}$ is the maximum voltage that can be supplied on the gate terminal of the transistor M by the device L6561 and $V_F$ the fall on the diode D3 (that is nearly the same as 0.7V).

The charge of C7 is completed up to the level of clipping by the resistance R8 whose value is such to keep the current $I_{ZCDx}$ injected into the circuit clipper within the specified limits. The resistance R8 must therefore satisfy the limit:

$$R8 > \frac{V_{GDx} - 5.6 - V_F}{I_{2CDx} + \frac{5.6}{R9}}$$

The voltage on the gate terminal of the transistor M will remain at the clipping level for the entire duration of the turn-on time period $T_{ON}$ of the MOS transistor M.

When the voltage F on the gate terminal of the transistor M is such that it turns off the transistor M, the diode D3 insulates the terminal AUX, whose voltage will start to decay exponentially tending to zero with the time constant given by the resistance R9 and by the capacitance C7. As soon as the voltage on the gate terminal of the transistor M becomes lower than 1.6V a SET S pulse will be launched on the flip-flop 11 and the voltage on the gate terminal of the transistor M will again rise marking the start of a new switching cycle. Given that the voltage on the gate terminal of the transistor M always starts from the upper clipping value (the R8-C6 array allows the clipping level to be reached also in the presence of very brief $T_{ON}$) the time needed for the voltage to reach trigger threshold at 1.6V, that defines the period of time $T_{OFF}$, will be constant. W will thus have:

$$T_{OFF} \approx R9C7\ln\frac{5.6}{1.6} = 1.25 R9C7.$$

Figure 7:
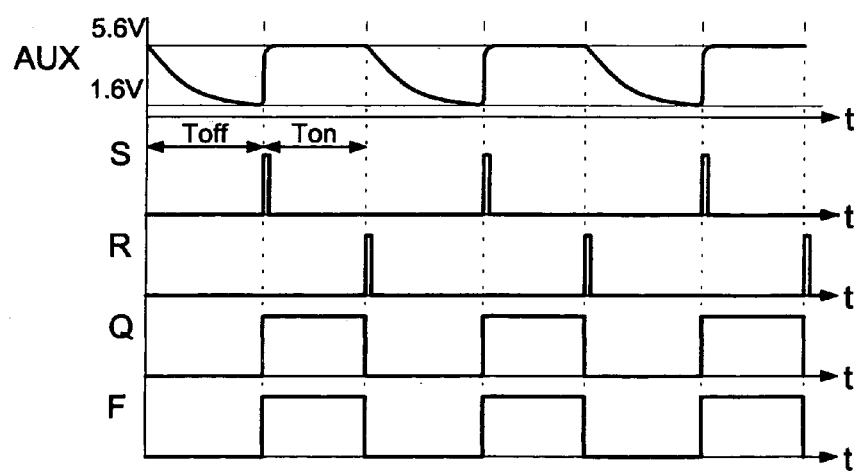
FIG. 7 shows time diagrams of signals of the PFC of FIG. 6.

FIG. 7 shows the most significant waveforms of the circuit of FIG. 6, that is the voltage signals AUX and F respectively on the terminals AUX and on the gate terminal of the transistor M, and the signals of set S, of reset R and Q.

Figure 8:
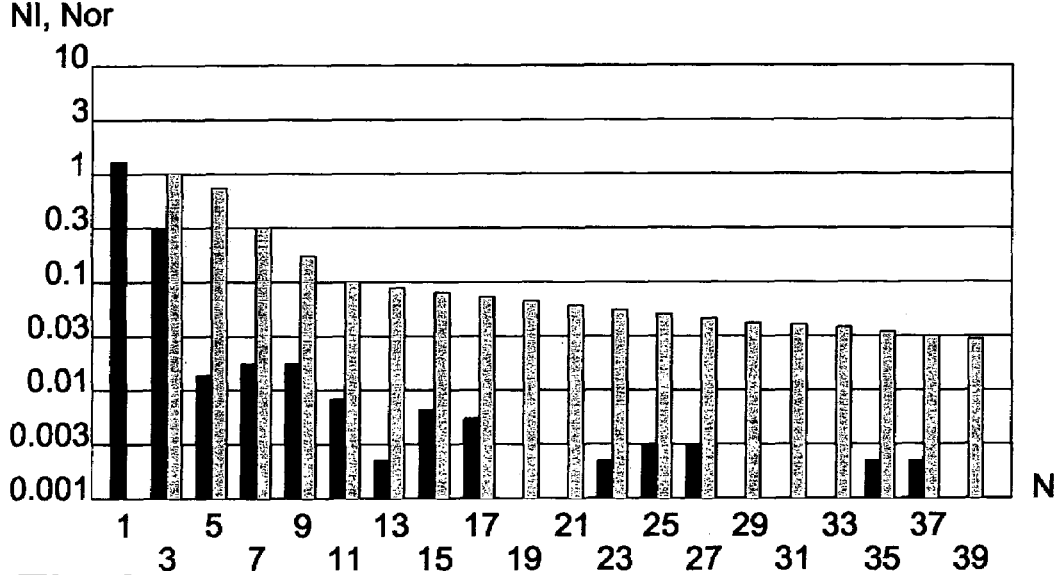
FIG. 8 shows the current harmonics NI and the limits NOR set out in the provisions EN61000-3-2 class D in function of the order of the harmonics N in relation to the circuit of FIG. 6 with an input voltage Vin=230 Vac at the frequency 50 Hz and an output power Pout=300 W.

FIG. 8 shows measurements of harmonic distortion relating to the circuit of FIG. 6, more precisely the current harmonics NI (black columns) and the limits NOR (grey columns) as per the regulations set out in EN61000-3-2 class D in function of the order of the harmonics N relating to the circuit of FIG. 6 with an input voltage Vin=230 Vac at frequency 50 Hz and an output power Pout=300 W. The distortion is always such that, as the measurements of FIG. 8 carried out on some prototypes also confirm, the harmonic content comes with a very wide margin within the limits provided for in regulations EN61000-3-2 class D.

The control at constant $T_{OFF}$ described up to now provides for a rigorously constant time $T_{OFF}$. In a variant of this modality the time $T_{OFF}$, even though keeping constant within each network cycle in nearly stationery conditions (that is, for constant input effective voltage and output current) can be modulated upon the variation of the input effective voltage and/or upon the variation of the output current. This implies that the timing operated by the device counter of FIG. 4 or the decay of the voltage on the pin AUX, with reference to the circuit of FIG. 6, can be influenced by representative voltages or currents of the input effective voltage and/or of the output current.

Figure 9:
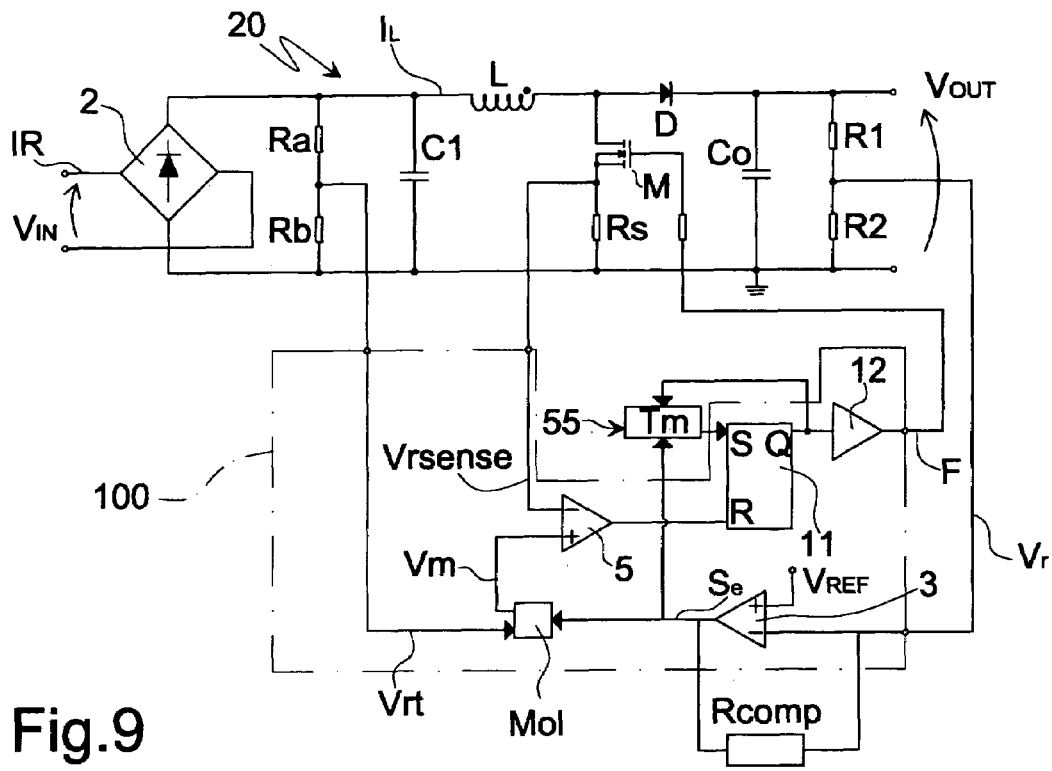
FIG. 9 shows a circuit diagram of a PFC according to a second embodiment of the present invention.

FIG. 9 shows a PFC according to a second embodiment of the invention; in this case the control of the period of time $T_{OFF}$ comes about modulating it upon the variation of a load connected to the output of the converter 20 and of the line. The circuit of FIG. 9 is similar to the circuit of FIG. 4 from which it differentiates only because the output Se of the error amplifier, that changes upon the variation both of the load and of the line, is used for modulating the timing operated by the counter Tm belonging to the control means 55. If in fact the counter Tm is implemented with the circuit of FIG. 4, the signal Se will be the suitable signal for modulating the current of the current generator Ich. In this manner there is a modulation of the period of turn-off time TOFF that depends on the load and on the line.

Should the circuit of FIG. 6 be used a possibility of obtaining a modulation of the period of turn-off time $T_{OFF}$ is to couple the signal Se by means of a resistance to the terminal AUX of the controller L6561 to obtain a decay of the voltage on said terminal upon the variation of the load or of the line.

Figure 10:
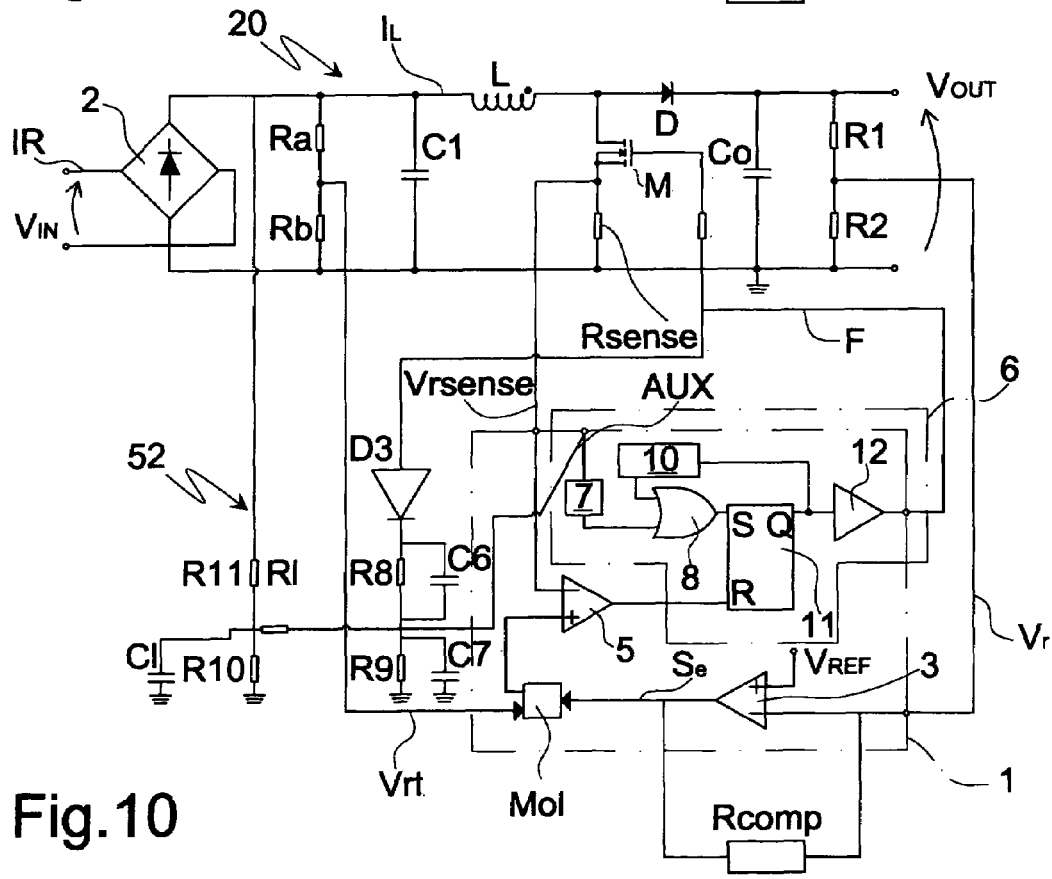
FIG. 10 shows a circuit diagram of a PFC according to a variant to the second embodiment of the present invention.

FIG. 10 shows a PFC circuit according to a variant to the second embodiment of the present invention; said PFC is similar to that of FIG. 6 but in which there is the modulation of the period of time $T_{OFF}$ upon the variation of the line basing itself on a device 52. The device 52 comprises, in addition to the circuit elements present in the device 51, the series of a resistance R1 and of a capacitor C1 located between the terminal AUX and ground, a resistance R11 located between the network voltage rectified by the diode bridge 2 and the terminal in common with the resistance R1 and the capacitance C1, and a resistance Ri0 located between said terminal and ground. The device 52 supplies on the capacitor C1, with a relatively high value, a direct voltage proportional to the network peak voltage and, thus, also to its effective value. This voltage, through the resistance R1 is conveyed to the terminal AUX, slowing the descent of the voltage during the period of time $T_{OFF}$, as much as the network voltage is high. Therefore there will be a $T_{OFF}$ proportional to the network voltage. This result can be obtained through other circuitries, or the $T_{OFF}$ could also be made in function of the load, without however going beyond the spirit and the sphere of the present invention.

A second modality of the control of the period of turn-off time $T_{OFF}$ provides for the system to be instead forced to operate in TM in the phase DCM of the network cycle. The advantage of this technique is to improve the form factor of the currents involved: at parity of circulating power there will be slightly lower peak and effective values, with this coming even closer to the form factor of the known PFCs with fixed frequency controller. From the executive point of view, the demagnetisation of the inductor has to be felt as in the TM systems, therefore the auxiliary winding and an interface circuit will again be necessary. A slight increase of the circuit complexity is the result.

In the section DCM (that is for $\theta<\theta_T$ and $\theta>\pi-\theta_T$) there is again a period of constant time $T_{ON}$ that is imposed by the control of peak current, but the frequency will not be constant and will vary in this manner as in the TM systems; the same can be said for the duty cycle:

$$f_{sw(DCM)} = \frac{LI_{Lpk}}{Vpk}\left(1 + \frac{Vpk\sin\theta}{Vo - Vpk\sin\theta}\right); D_{(DCM)} = 1 - \frac{Vpk}{Vout}\sin\theta.$$

In regard to the duty cycle of the current circulation in the coil there will obviously be $D_L(\theta)=1$ as in the section CCM. The average current in the inductor, will be given by:

$$I_{Lav}(\theta) = \begin{cases} \frac{1}{2}I_{Lenv}(\theta) & DCM/TM \\ I_{Lenv}(\theta) - \frac{1}{2}\Delta I_L(\theta) & CCM \end{cases}$$

that becomes:

$$I_{Lav}(\theta) = \begin{cases} \frac{1}{2} I_{Lpk} \sin\theta, & \sin\theta \le \sin\theta_T (DCM/TM) \\ \frac{1}{2} I_{Lpk} \left[ \left(2 + \frac{k\sin\theta_T}{1-k\sin\theta_T}\right) \sin\theta - \frac{\sin\theta_T}{1-k\sin\theta_T} \right], & \sin\theta > \sin\theta_T (CCM) \end{cases}$$

Proceeding as in the previous case $I_{Lpk}$ can be determined in function of the power Pin. We obtain:

$$I_{Lpk} = \frac{2Pin}{Vpk}\left(1 + \frac{4-k\pi}{2\pi}\theta_T\right)$$

that always results to be slightly less than the value given by the equation deduced previously for the same value.

FIG. 11 shows a PFC according to a third embodiment of the invention in which control means 53 are provided for that implement a different type of counter Tm suitable for this type of control.

In the description of the operation of the circuit of FIG. 11 the only thing that changes compared to the operation of the circuit of FIG. 3 previously described concerns the mechanism that determines that the transistor M is turned on and thus the duration of the $T_{OFF}$.

The output Q of the flip-flop 11 activates the counting of the counter Tm which, once a period of set time ($T_{OFF}$) has passed, that can be adjusted by means of external calibrating elements 60, sends an set pulse S to the flip-flop 11, with this determining that the transistor M is turned on. The counting of the counter Tm can be interrupted by a signal Vtcz coming from a block ZCD 70 having an input terminal connected with an auxiliary winding of the inductance L; said signal Vtcz, that signals that the demagnetisation of the inductor L has come about, causes the transistor M to be turned on. If it is in the portion CCM of the network semi cycle ($\theta_T<\theta<\pi-\theta_T$) the demagnetisation of the inductor L requires, by definition, a greater period than the period of time $T_{OFF}$ set with the external calibrating elements, therefore it will be the external timing that determines the duration of $T_{OFF}$ and the operation will be similar to that already seen in the standard formulation of the control at $T_{OFF}$ constant. If it is in the portion DCM ($\theta<\theta_T$ and $\theta>\pi-\theta_T$) the demagnetisation of the inductor requires, by definition, a lower time than the $T_{OFF}$ set with the external calibrating elements, therefore it will be the signal coming from the block ZCD 70 that commands the turn-on of the transistor M and the system will be forced to work in TM.

Figure 12:
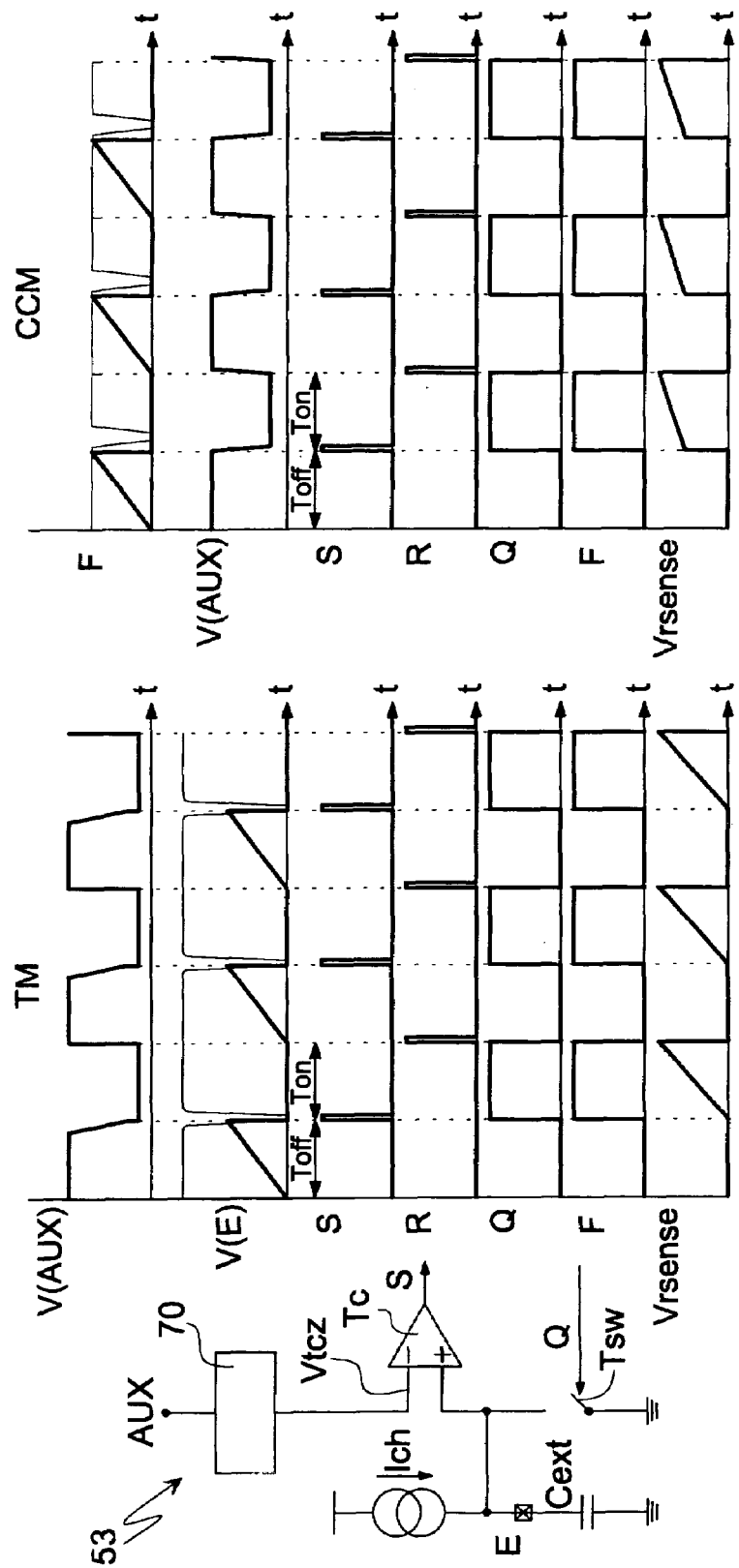
FIG. 12 shows a circuit implementation of the counter of FIG. 11 and time diagrams of signals of the PFC of FIG. 11 with the counter implemented as shown in said Figure.

FIG. 12 shows the most significant signals that determine the turn-on and the turn-off of the MOS transistor M, both in the section CCM and in the section DCM, and where the counter Tm has a structure that is similar to that of the counter Tm of FIG. 4 but with the voltage Vtcz in input to the comparator connected to a block ZCD 70. If it is in the section ($\theta<\theta_T$ and $\theta>\pi-\theta_T$) the block ZCD 70 brings Vtcz low determining the triggering of the comparator, the emission of a set pulse S and the consequent turning on of the transistor M. The result is evidently TM functioning. If it is in the section CCM ($\theta_T<\theta<\pi-\theta_T$) will be the intersection of the slope on the capacitor Cext with Vtcz determining the triggering of the comparator, the emission of the set pulse and the turn-on of the transistor M and the reset of the capacitor Cext. The negative edge that the ZCD 70 reveals is this time a consequence of the turn-on of the transistor M and no longer the cause: the lowering of Vtcz that follows comes about later in comparison to the triggering of the comparator and is therefore not important.

FIG. 13 shows the most significant signals that determine the turn-on and the turn-off of the transistor M inside the controller, both in the section CCM and in the section DCM, in the hypothesis that the counter, in addition in comparison to the counter of FIG. 12 and therefore as a variant in relation to the third embodiment of the invention, has a gate OR whose inputs are given by the output signal Vtcz from the block ZCD 70 (sensitive to negative voltage edges, as unlimiting example) which is positioned in OR with the signal Elapsed coming from the comparator. If it is in the section ($\theta<\theta_T$ and $\theta>\pi-\theta_T$) the block ZCD 70 emits an pulse Vtcz following the demagnetisation of the inductor which, through the gate OR, causes the emission of set pulse S and the consequent turning on of the transistor M and the reset of the capacitor Cext. The result is TM functioning. If it is in the section CCM ($\theta_T<\theta<\pi-\theta_T$) it will be the intersection of the slope on the capacitor Cext with the voltage VREF that determines the triggering of the comparator, that releases an pulse which, through the gate OR, causes the emission of the set pulse S, the turn-on of the transistor M and the reset of the capacitor Cext. The negative edge that the block ZCD 70 detects is this time a consequence of the transistor M being turned on and no longer the cause. The pulse Vtcz that is released comes about slightly later, is partially overlayed to the signal Elapsed and is therefore not important.

According to another variant to the third embodiment of the invention a PFC can be made adding a control circuitry 54 to the control device 1 of FIG. 1, for example the controller L6561 by STMicroelectronics, as shown in FIG. 14. The circuitry 54 differs from the device 52 of FIG. 6 in the presence of the series of a diode D4 and a resistance R6 located between a terminal of the auxiliary winding of the inductor L and the input Aux of the ZCD 70. FIG. 15 shows waveforms of the signals in several points of the circuit.

When the signal on the gate terminal of the transistor M is high, the timing capacitor C7 is first charged (ideally in zero time) by the capacitor C6 up to a slightly lower value than the high clipping threshold, and this is to avoid sending an uncontrolled current inside the upper clipping circuit. The charge of C7 is completed up to the level of clipping by the resistance R8 whose value is such to keep the current injected in the clipping circuit within the specified limits. In these conditions the resistance R12, connected to the voltage generated by the auxiliary winding, that is negative, subtracts a bit of the charge current of C7 but, as the value is very high, it does not slow the charge significantly. The voltage on C7 will stay at the clipping level for the whole turn-on duration $T_{ON}$ of the transistor M.

When the signal on the gate terminal of the transistor M is low and the transistor M is off, the voltage generated by the auxiliary winding becomes positive and the diode D5 is polarized inversely. The diode D3 insulates the terminal AUX and the voltage on the capacitor C7 will start to decay exponentially tending to zero with the time constant given by the resistance R9 and by the capacitor C7. If it is in the portion CCM of the network half cycle ($\theta_T<\theta<\pi-\theta_T$) the voltage will reach 1.6V before the inductor L is demagnetised and therefore the period of time $T_{OFF}$ is fixed at the value given by the previous equation. When the programmed period of time $T_{OFF}$ is reached, a set pulse S will be launched on the flip-flop 11 and the signal on the gate terminal of the transistor M will again become high signalling the start of a new switching cycle. If, instead, it is in the zone in which $\theta<\theta_T$ and $\theta>\pi-\theta_T$, the inductor will demagnetise before the voltage on the capacitor C7 has reached the voltage 1.6V and, because of the demagnetisation, the voltage generated by the auxiliary winding from positive will become negative. The diode D5 is thus polarized directly and by means of the resistance R12 the voltage on the capacitor C7 is forced to cross the trigger threshold of 1.6V. Thus, in this case, it is the demagnetisation of the inductor that launches the set pulse, to command the turn-on of the transistor M and to start a new switching cycle; there is therefore TM type functioning.

The invention claimed is:

1. A device for the correction of the power factor in forced switching power supplies, said device comprising:
   a converter; and
   a first control circuit coupled with said converter so as to obtain a regulated voltage on the output terminal from an alternating network input voltage,
   wherein said converter comprises a power transistor, said first control circuit being suitable for driving said power transistor in every switching cycle comprising the turn-on time and the turn-off time of said power transistor, and
   said device further comprises a second control circuit coupled to said first control circuit, said second control circuit for modulating the turn-off time of said power transistor such that the turn-off time is kept fixed for every switching cycle.

2. The device according to claim 1, wherein said second control circuit comprises a counter suitable for counting the turn-off time.

3. The device according to claim 1,
   wherein said converter comprises a rectifier circuit suitable for rectifying said network voltage in input,
   said first control circuit comprises:
      an error amplifier having on its inverting input a first signal proportional to said regulated voltage and on its non-inverting input a reference signal,
      a multiplier receiving a second signal proportional to the voltage rectified by said rectifier circuit and an error signal output from said error amplifier,
      a comparator suitable for comparing a third signal output from said multiplier and a fourth signal proportional to the current that flows in said power transistor,
      a set-reset flip-flop receiving at its reset input a fifth signal output from said comparator, the output signal from said flip-flop controlling the drivable terminal of said power transistor, and
      a zero detector suitable for supplying a set signal to said flip-flop, and
   said output signal of said flip-flop is supplied to said second control circuit that supplies a further signal to said zero detector.

4. The device according to claim 3, wherein said second control circuit comprises a diode having its anode connected with the drivable terminal of the power transistor and its cathode connected to a parallel connection of a resistor and a capacitor located between the drivable terminal of the power transistor and the input terminal of the zero detector, and a further parallel of a further resistor and a further capacitor located between the input terminal of the zero detector and ground, said diode providing for the isolations of said further parallel when said power transistor is off, said further parallel being suitable for fixing the value of said further signal so that when the value of said signal becomes lower than a preset value the zero detector it commands the power transistor to be turned on again, the decay period of the voltage signal in said further parallel being the turn-off time period.

5. The device according to claim 1,
   wherein said converter comprises a rectifier circuit suitable for rectifying said network input voltage,
   said first control circuit comprises:
      an error amplifier having on its inverting input a first signal proportional to said regulated voltage and on its non-inverting terminal a reference signal,
      a multiplier receiving a second signal proportional to the voltage rectified by said rectifier circuit and an error signal output from said error amplifier,
      a comparator suitable for comparing a third signal output from said multiplier and a fourth signal proportional to the current that flows in said power transistor, and
      a set-reset flip-flop receiving at its reset input a fifth signal output from said comparator, the output signal from said flip-flop controlling the drivable terminal of said power transistor,
   said output signal activates said second control circuit,
   the second control circuit comprises a zero detector and a counter,
   said converter comprises an inductance located between the diode bridge and a non-drivable terminal of the power transistor, and
   said device for the correction of the power factor further comprising an auxiliary winding of said inductance whose voltage signal is input to said zero detector, said zero detector having an output signal suitable for acting on said counter for modulating the turn-off time.

6. The device according to claim 5, wherein said counter comprises a capacitor connected between ground and a current generator, a comparator having its non-inverting terminal connected to a terminal in common between said capacitor and said current generator and having its inverting terminal connected to the output signal of the zero detector so that when the voltage on the capacitor reaches said voltage signal a set signal output from said comparator is sent to the flip-flop.

7. The device according to claim 5, wherein said counter comprises a capacitor connected between ground and a current generator, a comparator having its non-inverting terminal connected to a terminal in common between said capacitor and said current generator and having its inverting terminal connected to a reference signal, said second control circuit comprising an OR gate whose inputs are the output signal of the comparator and the output signal of the zero detector so that when the voltage on the capacitor reaches said reference signal or when a zero is detected by the zero detector the set signal output from the OR gate is sent to the flip-flop.

8. The device according to claim 1,
   wherein said converter comprises a rectifier circuit suitable for rectifying said network input voltage, said first control circuit comprises:
an error amplifier having on its inverting input a first signal proportional to said regulated voltage and on its non-inverting terminal a reference signal,
a multiplier receiving a second signal proportional to the voltage rectified by said rectifier circuit and an error signal output from said error amplifier,
a comparator suitable for comparing a third signal output from said multiplier and a fourth signal proportional to the current that flows in said power transistor,
a set-reset flip-flop receiving at its reset input a fifth signal output from said comparator, the output signal from said flip-flop controlling the drivable terminal of said power transistor, and
a zero detector suitable for supplying a set signal to said flip-flop,
said converter comprising an inductance located between the diode bridge and a non-drivable terminal of the power transistor, and
said device for the correction of the power factor further comprising an auxiliary winding of said inductance, said output signal of said flip-flop being capable of feeding said second control circuit that supplies a further signal to said zero detector.

9. The device according to claim 8, wherein said second control circuit comprises a diode having its anode connected with the drivable terminal of the power transistor and its cathode connected to a parallel connection of a resistor and a capacitor located between the drivable terminal of the power transistor and the input terminal of the zero detector, and a further parallel of a further resistor and a further capacitor located between the input terminal of the zero detector and ground, said diode providing for the insulation of said further parallel when said power transistor is off, said further parallel being suitable for fixing the value of said further signal so that when the value of said signal becomes lower than a preset value the zero detector command the power transistor to turn on again, the decay period of the voltage signal in said further parallel being the turn-off time period, said second control circuit comprising another diode having its cathode connected with a terminal of said auxiliary winding and coupled with said input terminal of the zero detector so that when a negative voltage is present on the auxiliary winding a lowering of the turn-off period is determined.

10. A device for the correction of the power factor in forced switching power supplies, said device comprising:
a converter; and
a first control circuit coupled with said converter so as to obtain a regulated voltage on the output terminal from an alternating network input voltage,
wherein said converter comprises a power transistor, said first control circuit being suitable for driving said power transistor in every switching cycle comprising the turn-on time and the turn-off time of said power transistor,
said device further comprises a second control circuit coupled to said first control circuit, said second control circuit for modulating the turn-off time of said power transistor,
said second control circuit comprises a counter suitable for counting the turn-off time,
said converter comprises a rectifier circuit suitable for rectifying said network input voltage, said first control circuit comprises:
an error amplifier having on its inverting input a first signal proportional to said regulated voltage and on its non-inverting input a reference signal,
a multiplier receiving a second signal proportional to the voltage rectified by said rectifier circuit and an error signal output from said error amplifier,
a comparator suitable for comparing a third signal output from said multiplier and a fourth signal proportional to the current that flows in said power transistor, and
a set-reset flip-flop receiving at its reset input a fifth signal output from said comparator, the output signal from said flip-flop controlling the drivable terminal of said power transistor,
said output signal of said flip-flop activates said counter, and
the counter supplying a set signal to said flip-flop.

11. The device according to claim 10, wherein said counter comprises a capacitor connected between ground and a current generator, a comparator having its non-inverting terminal connected to a terminal in common between said capacitor and said current generator and having its inverting terminal connected to a reference voltage signal so that when the voltage on the capacitor reaches said reference voltage signal the set signal is sent to the flip-flop.

12. The device according to claim 11, wherein said second control circuit comprises a switch connected between ground and the non-inverting terminal of the comparator and driven by the output signal of the flip-flop for discharging said capacitor when the voltage on said capacitor reaches said reference voltage signal, said capacitor having such a value that its discharge time is lower than the period of the turn-on time of the power transistor.

13. A device for the correction of the power factor in forced switching power supplies, said device comprising:
a converter; and
a first control circuit coupled with said converter so as to obtain a regulated voltage on the output terminal from an alternating network input voltage,
wherein said converter comprises a power transistor, said first control circuit being suitable for driving said power transistor in every switching cycle comprising the turn-on time and the turn-off time of said power transistor,
said device further comprises a second control circuit coupled to said first control circuit, said second control circuit for modulating the turn-off time of said power transistor such that the turn-off time is kept fixed for every switching cycle and such that the turn-off time is modulated as a function of an effective or instantaneous value of the network input voltage.

14. The device according to claim 13,
wherein said converter comprises a rectifier circuit suitable for rectifying said network input voltage,
said first control circuit comprises:
an error amplifier having on its inverting input a first signal proportional to said regulated voltage and on its non-inverting input the reference signal,
a multiplier receiving a second signal proportional to the voltage rectified by said rectifier circuit and an error signal output from said error amplifier,
a comparator suitable for comparing a third signal output from said multiplier and a fourth signal proportional to the current that flows in said power transistor, a set-reset flip-flop receiving at its reset input a fifth signal output from said comparator, the output signal from said flip-flop controlling the drivable terminal of said power transistor, and a zero detector suitable for supplying a set signal to said flip-flop, and said output signal of said flip-flop is supplied to said second control circuit that supplies a further signal to said zero detector.

15. The device according to claim 14, wherein said second control circuit comprises a diode having its anode connected with the drivable terminal of the power transistor and its cathode connected to a parallel connection of a resistor and a capacitor located between the drivable terminal of the power transistor and the input terminal of the zero detector, and a further parallel of a further resistor and a further capacitor located between the input terminal of the zero detector and ground, another capacitor at whose terminals a further direct voltage signal proportional to the effective value of the network voltage is present, said diode providing for the insulation of said further parallel when said power transistor is off, said further parallel being suitable for fixing the value of said further signal so that when the value of said signal becomes lower than a preset value the zero detector commands the power transistor to turn on again, the decay period of the voltage signal in said further parallel being the turn-off time period, said further direct voltage signal being conveyed by a further resistance on the input of the zero detector to increase said turn-off period proportionally to the network voltage.

16. The device according to claim 13, wherein said converter comprises a rectifier circuit suitable for rectifying said network input voltage, said first control circuit comprises:

an error amplifier having on its inverting input a first signal proportional to said regulated voltage and on its non-inverting input a reference signal, a multiplier receiving a second signal proportional to the voltage rectified by said rectifier circuit and an error signal output from said error amplifier, a comparator suitable for comparing a third signal output from said multiplier and a fourth signal proportional to the current that flows in said power transistor and a set-reset flip-flop receiving at its reset input a fifth signal output from said comparator, the output signal from said flip-flop controlling the drivable terminal of said power transistor, said output signal of said flip-flop activates said second control circuit, and the second control circuit is controlled by the error signal output from the error amplifier and supplies a set signal to said flip-flop modulated by said error signal.

17. The device according to claim 16, wherein said second control circuit comprises a counter comprising a capacitor connected between ground and a current generator controlled by said error signal, a comparator having its non-inverting terminal connected to a terminal in common between said capacitor and the current generator and having its inverting terminal connected to a reference voltage signal so that when the voltage on the capacitor reaches said reference voltage signal the set signal is sent to the flip-flop.

18. The device according to claim 13, wherein said converter comprises a rectifier circuit suitable for rectifying said network input voltage, said first control circuit comprises:

an error amplifier having on its inverting input a first signal proportional to said regulated voltage and on its non-inverting terminal a reference signal, a multiplier receiving a second signal proportional to the voltage rectified by said rectifier circuit and an error signal output from said error amplifier, a comparator suitable for comparing a third signal output from said multiplier and a fourth signal proportional to the current that flows in said power transistor, a set-reset flip-flop receiving at its reset input a fifth signal output from said comparator, the output signal from said flip-flop controlling the drivable terminal of said power transistor, and a zero detector suitable for supplying a set signal to said flip-flop, said output signal of said flip-flop is supplied to said second control circuit that supplies a further signal to said zero detector, said second control circuit comprises a diode having its anode connected with the drivable terminal of the power transistor and its cathode connected to a parallel connection of a resistor and a capacitor located between the drivable terminal of the power transistor and the input terminal of the zero detector, and a further parallel of a further resistor and a further capacitor located between the input terminal of the zero detector and ground, said diode providing for the insulation of said further parallel when said power transistor is off, said input terminal of the zero detector having in input said error signal, said further parallel being suitable for fixing the value of said further signal so that when the value of said signal becomes lower than a preset value the zero detector commands the power transistor to turn on again, the decay period of the voltage signal in said further parallel being the turn-off time period.

19. A device for the correction of the power factor in forced switching power supplies, said device comprising:

a converter; and a first control circuit coupled with said converter so as to obtain a regulated voltage on the output terminal from an alternating network input voltage, wherein said converter comprises a power transistor, said first control circuit being suitable for driving said power transistor in every switching cycle comprising the turn-on time and the turn-off time of said power transistor, said device further comprises a second control circuit coupled to said first control circuit, said second control circuit for modulating the turn-off time of said power transistor such that the turn-off time is kept fixed for every switching cycle and such that the turn-offtime is modulated as a function of a current demanded by a load that is connected to the output terminal.

* * * * *

UNITED STATES PATENT AND TRADEMARK OFFICE
CERTIFICATE OF CORRECTION

PATENT NO. : 7,279,876 B2
APPLICATION NO. : 10/877439
DATED : October 9, 2007
INVENTOR(S) : Claudio Adragna et al.

It is certified that error appears in the above-identified patent and that said Letters Patent is hereby corrected as shown below:

Please add the following priority section which is missing from the Title page of the letters patent (page 1):

-- (30) Foreign Application Priority Data

June 27, 2003     (IT)     ……………………….MI2003 A 001315 --

Signed and Sealed this

Tenth Day of June, 2008

JON W. DUDAS
*Director of the United States Patent and Trademark Office*